US012176158B2

(12) United States Patent
Quilling et al.

(10) Patent No.: US 12,176,158 B2
(45) Date of Patent: Dec. 24, 2024

(54) ILLUMINATION SYSTEM AND METHOD FOR MAINTAINING A COMMON ILLUMINATION VALUE ON A RELEASE COMMAND SENT FROM A KEYPAD

(71) Applicant: Lutron Technology Company, LLC, Coopersburg, PA (US)

(72) Inventors: Mark Quilling, Vero Beach, FL (US); Rebecca Frank, Austin, TX (US); Kenneth Priester, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/413,457

(22) Filed: Jan. 16, 2024

(65) Prior Publication Data
US 2024/0153721 A1 May 9, 2024

Related U.S. Application Data

(63) Continuation of application No. 18/161,121, filed on Jan. 30, 2023, now Pat. No. 11,908,638, which is a continuation of application No. 17/556,122, filed on Dec. 20, 2021, now Pat. No. 11,569,048, which is a continuation of application No. 17/136,922, filed on
(Continued)

(51) Int. Cl.
*H05B 45/10* (2020.01)
*G06F 3/0489* (2022.01)
*H01H 13/02* (2006.01)
*H05B 45/20* (2020.01)
*H05B 47/19* (2020.01)

(52) U.S. Cl.
CPC ............. *H01H 13/02* (2013.01); *H05B 45/10* (2020.01); *H05B 45/20* (2020.01); *H05B 47/19* (2020.01); *G06F 3/0489* (2013.01); *H01H 2231/012* (2013.01); *H01H 2231/016* (2013.01); *H01H 2300/03* (2013.01)

(58) Field of Classification Search
None
See application file for complete search history.

(56) References Cited

U.S. PATENT DOCUMENTS 9,392,663 B2 7/2016 Knapp et al.
9,655,215 B1 5/2017 Ho et al.
(Continued)

*Primary Examiner* — Anh Q Tran
(74) *Attorney, Agent, or Firm* — Michael S. Czarnecki; Glen R. Farbanish; Philip N. Smith

(57) ABSTRACT

An illumination system and method are disclosed for maintaining a consistent change in illumination value among a group of illumination devices whenever a change command is manually sent from a keypad to those illumination devices. The consistent change results from maintaining a common start illumination value among not only the group, but also the keypad which controls the group. From the start illumination value, the keypad can then compute an end illumination value depending upon the amount of time that an increase or decrease in illumination value button is depressed and held. Since the change command can arrive at different illumination devices within the group depending upon where each illumination device is geographically located, a masking time is reserved after the button is released so that enough time is allocated for each of the illumination devices within that group to arrive at a common end illumination value.

15 Claims, 8 Drawing Sheets

Related U.S. Application Data

Dec. 29, 2020, now Pat. No. 11,211,210, which is a continuation of application No. 16/813,097, filed on Mar. 9, 2020, now Pat. No. 10,917,958, which is a continuation of application No. 16/417,107, filed on May 20, 2019, now Pat. No. 10,588,207, which is a continuation of application No. 15/878,742, filed on Jan. 24, 2018, now Pat. No. 10,299,356.

(56) References Cited

U.S. PATENT DOCUMENTS

| | | |
|---|---|---|
| 10,299,356 B1 | 5/2019 | Quilling et al. |
| 10,588,207 B2 | 3/2020 | Quilling et al. |
| 11,569,048 B2 | 1/2023 | Quilling et al. |
| 2009/0206983 A1 | 8/2009 | Knode et al. |
| 2013/0075484 A1* | 3/2013 | Rhee .................. G05D 23/185 236/51 |
| 2014/0225526 A1 | 8/2014 | Jonsson |
| 2016/0044765 A1* | 2/2016 | Campbell ............. H05B 45/20 315/152 |
| 2016/0302279 A1* | 10/2016 | Pope ..................... H05B 47/11 |
| 2019/0380192 A1 | 12/2019 | Quilling et al. |

* cited by examiner

ILLUMINATION SYSTEM AND METHOD FOR MAINTAINING A COMMON ILLUMINATION VALUE ON A RELEASE COMMAND SENT FROM A KEYPAD

CROSS-REFERENCE TO RELATED APPLICATIONS

This application is a continuation of U.S. patent application Ser. No. 18/161,121, filed Jan. 30, 2023; which is a continuation of U.S. patent application Ser. No. 17/556,122, filed Dec. 20, 2021, now U.S. Pat. No. 11,569,048, issued Jan. 31, 2023; which is a continuation of U.S. patent application Ser. No. 17/136,922, filed Dec. 29, 2020, now U.S. Pat. No. 11,211,210, issued Dec. 28, 2021; which is a continuation of U.S. patent application Ser. No. 16/813,097, filed Mar. 9, 2020, now U.S. Pat. No. 10,917,958, issued Feb. 9, 2021; which is a continuation of U.S. patent application Ser. No. 16/417,107, filed May 20, 2019, now U.S. Pat. No. 10,588,207, issued Mar. 10, 2020; which is a continuation of U.S. patent application Ser. No. 15/878,742, filed Jan. 24, 2018, now U.S. Pat. No. 10,299,356, issued May 21, 2019; entitled "Illumination System and Method for Maintaining a Common Illumination Value on a Release Command Sent from a Keypad", the entire disclosures of each of which are hereby incorporated by reference.

BACKGROUND OF THE INVENTION

Field of the Invention

This invention relates to multiple illumination devices arranged within a communication network to illuminate a structure, and to be controlled by one or more remote controller keypads that, after a press, hold, and thereafter release of a button on the keypad, the illumination devices controlled by the keypad change and thereafter obtain a common illumination value with each other and with the keypad.

Description of Related Art

The following descriptions and examples are provided as background only and are intended to reveal information that is believed to be of possible relevance to the present invention. No admission is necessarily intended, nor should be construed, that any of the following information constitutes prior art impacting the patentable character of the subject matter claimed herein.

Within a structure are various lighting devices such as lamps, which are hereinafter referred to as illumination devices. Typically, a structure contains multiple illumination devices scattered about rooms of that structure. The illumination devices within a room can be controlled by one or more keypads oftentimes situated on or near a wall of that corresponding room.

Popular types of illumination devices include incandescent lights, fluorescent lights, and the increasingly popular light-emitting diode (LED) lights. Of particular importance is that for general illumination, LEDs provide an opportunity to adjust their illumination value more so than other general illumination devices. For example, the driver circuit within an LED illumination device can more readily receive commands to change illumination values to give a broader spectrum of illumination control than incandescent and fluorescent lights. Illumination values are defined as illumination properties of an illumination device, such as a value that influences illumination or the illumination device output. An example of illumination value includes intensity, brightness, color temperature, chromaticity, tint, shade, tone, vibrancy, illuminance, flux, etc.

There are various ways in which to control an illumination value of an illumination device, such as an LED. One way is to send a command from a keypad that is wirelessly connected to the illumination devices that are being controlled. Typically, the illumination devices within a structure are coupled within a network, and all the illumination devices can be segregated into groups. For example, there can be one group associated with one room, and another group can be associated with another room. A keypad can control one or more groups of illumination devices if that keypad can wirelessly communicate with those groups.

The illumination devices can be interconnected wirelessly through a wireless personal area network (WPAN), with radio frequency (RF) or infrared (IR) wireless communication, from a keypad to a group of illumination devices occurring over one or more hops of a routing table stored in each of the illumination devices within the WPAN. When a button is pressed on a keypad, for example, a broadcast or groupcast command can be sent to a group of illumination devices via the routing table across a plurality of hops to the destination illumination device within that group. For example, if an illumination value is to be changed among a group of illumination devices, a single press, double press, or press and hold user activity on a keypad button can be used to change the illumination value imparted on or output from the group.

A problem occurs, however, when some illumination devices within a group are more distal than others within that same group. When a command is wirelessly sent from a keypad via, for example, a press-and-hold actuation on a button, an increase or decrease in illumination value corresponding to the amount of time that the button is pressed and held will register differently among the group of illumination devices. The amount of time that a press-and-hold actuation occurs may be indicative of the amount of change in illumination value imparted on the corresponding group of illumination devices and can vary depending on the length of the wireless communication, the number of hops between the keypad source and the target destination, any interference on the communication channel, and the number of retries that might be needed. If the amount of time that a button is pushed and held is to correspond with the amount of change in illumination value registered on the group of illumination devices being controlled, then the nearest illumination device may have a greater change in illumination value than the more distal illumination device due to the natural shortcomings of wireless RF communication within a hop-based WPAN. Accordingly, keypads that have plus (+) and minus (−) buttons to increase/decrease one or more illumination values in the corresponding illumination devices being controlled, those keypads can send the illumination value change signal from the keypad at the same time yet the change command is nonetheless received at different times on different illumination devices being controlled, thereby leaving illumination devices within the controlled group at different illumination values when the plus or minus button is released. This problem is compounded when the plus or minus button is pressed again, later. The dissimilar end illumination values registered on the group when the button is released becomes the dissimilar start illumination values when the button is pressed again. Thus, the start illumination value for the next press-and-hold activity becomes even further out of sync among the group, causing the more distal illumination devices to compound their lessened illumination value change relative to the closer illumination devices for each successive press, hold, and release.

It is therefore desirable to implement a wireless network of illumination devices segregated into groups controlled by one or more keypads having a button that can be pressed, held, and thereafter released to effectuate not only the same amount of illumination value change among a group of disparate illumination devices, but also to ensure that the start illumination value among that group is the same, as well as the end illumination value among that group. A need exists in having a structure containing one or more groups of illumination devices controlled by one or more keypads that can broadcast a group address to the corresponding group of illumination devices being controlled, as well as a start-change signal or command to start illumination change to that group. A need also exists in computing an end illumination value within the keypad and sending the end illumination value as a command to achieve that end illumination value to the group of illumination devices so that regardless of when each illumination device receives the start-change command, each member of the group of illumination devices changes its corresponding illumination value to arrive at the end illumination value no matter where each illumination device is located within a structure, within the WPAN, or within that group. In addition to scenes, shows, group addresses, and routing tables, a need still further exists in having each illumination device within a group obtain a common end illumination value within a pre-defined amount of time needed to gradually fade at a consistent, previously changing rate to the end illumination value when a button on the controlling keypad is released so that it achieves an illumination value common among disparately located illumination devices within a group.

SUMMARY OF THE INVENTION

The following description of various embodiments of an illumination system and method hereof is not to be construed in any way as limiting the subject matter of the appended claims. Instead, the following description outlines the various solutions to the problems and needs described above, wherein such problems are in large part solved by an improved illumination system and method for maintaining a common illumination value, and specifically, an end illumination value among a group of illumination devices when a button on a keypad that wirelessly controls that group is released after it has been pressed and held past a hold time. The illumination devices can include any device that provides an illumination output; however, a preferred illumination device is one having one or more LEDs, preferably arranged in chains. The keypad can be any device having a processor and memory to compute and store start and end illumination values, and can send those values, as well as a start-change signal wirelessly over an RF channel, for example, to one or more groups of illumination devices within a WPAN. A popular communication network for a WPAN includes a mesh network, and a popular communication protocol includes IEEE 802.15.4, a subset of which is ZigBee. The keypad can be associated with a mobile device, such as a smartphone. Instead of the press, hold, and release button being on a wall mount plate of a switch, for example, the button or buttons of the keypad can be on a graphical user interface (GUI) of the mobile device. The mobile device might communicate using the Ethernet, Wi-Fi, or Bluetooth to a bridge, hub, or gateway before communication to the plurality of the illumination devices arranged in a WPAN mesh that communicates via ZigBee.

According to a first embodiment, an illumination system is provided. The illumination system comprises a keypad and a group of illumination devices wirelessly coupled to the keypad. The keypad comprises a button configured to send a start-change signal or command to begin changing the illumination value or values in the illumination devices when the button on the keypad is held beyond a hold time and is further configured to send an end illumination value as a command to the illumination devices to obtain that end illumination value when the button is released after sending the start-change signal. The group of illumination devices are not only wirelessly coupled to the keypad, but also wirelessly coupled to each other over one or more hops. The group of illumination devices can receive the start-change signal at different times and thereafter achieve the end illumination value common among the group of illumination devices at different times after the button is released. Yet, because of a pre-determined masking time available to each of the illumination devices in the group, those illumination devices are allowed to continue an additional fade for each illumination device when they receive the end illumination value. In this fashion, illumination devices can never get out of sync from each other in the group, and from the controlling keypad, unless those illumination devices do not receive the end illumination value command Absent the masking time, the illumination devices would pop quickly to the end value instead of fading smoothly and consistently with the previously changing rate over, for example, one second masking time.

Regardless of when each illumination device within the group achieves the end illumination value, the end illumination value will be common among the group as long as the end illumination value command is received by the group and the end illumination value is smoothly achieved over the masking time, within the dedicated, pre-defined masking time amount that begins after the button is released and continues for a duration necessary for each illumination device to gradually settle to the common end illumination value. That common end illumination value is stored in each illumination device for use as the start illumination value from which the subsequent change occurs the next time that the button is pressed and held past the hold time amount and the start-change signal is sent.

According to a second embodiment, an illumination system is provided that comprises a keypad having a button that, when pressed and held beyond a hold time and released thereafter, the keypad computes an end illumination value based on an amount of time that has elapsed after the hold time and thereafter when the button is released. The illumination system according to the second embodiment further comprises a group of illumination devices wirelessly coupled to the keypad for receiving the start-change signal or command as well as the end illumination value within an end illumination value signal or command sent from the keypad for gradually and smoothly changing an illumination value from the group of illumination devices to the end illumination value at different times after the button is released, yet all within the masking time.

According to both above embodiments, the keypad and group of illumination devices are wirelessly coupled, preferably over an RF network that is a WPAN. When a signal or command is sent from the keypad across the WPAN, from hop-to-hop to a group of illumination devices controlled by a button actuation on the keypad, that command is received on the group of illumination devices at different times depending on the distance between the keypad and each of the group of illumination devices, the number of hops therebetween, whether there is interference on the wireless channel, or if multiple retries are needed causing the command to be sent multiple times before an acknowledge is sent back that the recipient illumination device received that command. The different delays between the keypad and corresponding illumination devices within a group being controlled necessitates a masking time to be appended after the button is released. A masking time of, for example, a predefined one second, allows illumination devices that may be more distal and thereby having a greater delay in command receipt to complete the change in its value up to, or down to, the end illumination value. Without the appended masking time, various ones of the group of illumination devices may have different illumination values when they receive the release signal or command from the keypad signifying the end of the start-change signal. Moreover, as noted in conventional press, hold, and release keypads, when the subsequent start-change signal is sent from a keypad, if the group of illumination devices previously had different illumination values, the change in illumination value would therefore begin from different start illumination values resulting in a further disparity in the resulting illumination value upon a button release. That disparity would continue to grow each time a button is pressed and thereafter released on the keypad due to the cumulative static disparity in illumination device locations within that group.

According to yet a third embodiment, a method is provided for controlling an illumination value within a group of illumination devices. The method comprises pressing a button on a keypad. Thereafter, the method comprises holding the button on the keypad for more than a predetermined amount of time, such as a hold time. A start-change signal along with a group address is then groupcast from the keypad to the group of illumination devices having the group address, across one or more hops. The illumination value in each of the group of illumination devices thereafter begins their change. A button on the keypad can then be released, thereby terminating the changing of the illumination value in each of the group of illumination devices but at different times yet each arriving at the same end illumination value after releasing the button on the keypad and positively sending the end illumination value computed on the keypad.

The step of begin changing occurs from the same or common start illumination value that is stored in each of the group of illumination devices as well as the keypad that controls that group. Therefore, the start illumination value is preferably the same throughout the keypad and group and, since the step of changing the illumination value in each of the group of illumination devices terminates at different times, the same or common end illumination value results in that keypad and that group being controlled by that keypad. Terminating the changing of the illumination value at different times preferably occurs within the pre-defined masking time after the button is released on the keypad. The masking time is a time allotted so that all the group of illumination devices have enough time to eventually achieve the end illumination value groupcast as a command from the keypad to the group of illumination devices being controlled regardless of how many hops, interference, retries, etc., the wireless communication channel encounters.

BRIEF DESCRIPTION OF THE DRAWINGS

Other objects and advantages of the invention will become apparent upon reading the following detailed description and upon reference to the accompanying drawings.

DETAILED DESCRIPTION OF THE PREFERRED EMBODIMENTS

Figure 1:
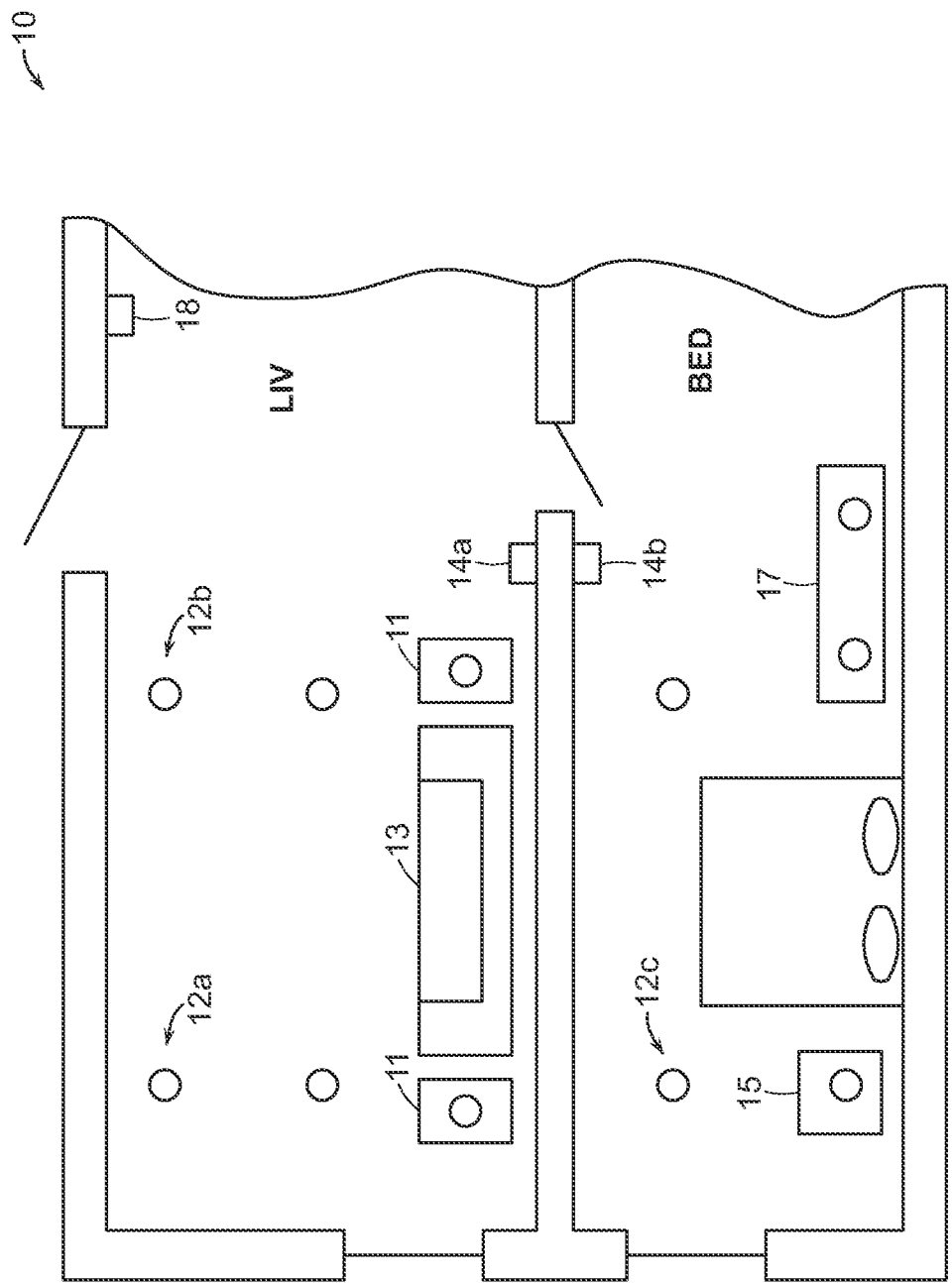
FIG. 1 is a plan diagram of a structure comprising a plurality of illumination devices wirelessly in communication with each other and with a remote control keypad that is either a physical keypad or a virtual keypad on a graphical user interface (GUI) of a mobile device linked to the network of illumination devices by a gateway, router or hub.

Turning now to the drawings, FIG. 1 illustrates an example of a residence 10 containing a plurality of illumination devices 12a, 12b, 12c, etc. Not all illumination devices are labeled for sake of brevity in the drawings. A residence, or structure 10, may have numerous bedrooms, living rooms, and outdoor illumination regions, and a significant number of illumination devices 12 can be arranged throughout that structure, more so than those shown in FIG. 1.

Preferably, each illumination device 12 comprises at least one LED and a wireless communication interface. A popular communication protocol can be WPAN using IEEE 802.15.4 and/or any protocol based thereon, such as ZigBee. The illumination devices within various rooms can have different functionality and have different appearances. For example, illumination devices in the ceiling may be PAR illumination devices, whereas illumination devices in nightstands, or next to couches, can be A20 illumination devices. There can also be illumination devices, or lamps, such as wall lamps, or any other type of configuration needed for a structure 10. In the example shown in FIG. 1, the living room can have four illumination devices arranged as downlights in the ceiling and two illumination devices placed on stands 11 next to a couch 13. Moreover, structure 10 can have at least one bedroom, with possibly two downlight illumination devices mounted in the ceiling, an illumination device on nightstand 15, and two illumination devices on chest 17. Of course, there can be multiple other configurations, with the configuration shown in FIG. 1 as only an example of illumination devices 12 arranged within a portion of a structure 10.

Also arranged within structure 10 are keypads 14a and 14b, possibly mounted on a wall, like a light switch. Like illumination devices 12, keypads 14 can be removably coupled to an AC mains. The AC mains can provide power to the illumination devices and keypads 14. However, in some instances, the keypad need only be coupled to the AC mains for recharging an internal battery within each keypad so that the keypad can be removed and taken from its, for example, wall mount location to anywhere within a room having a group of illumination devices that it controls. As shown in FIG. 1, keypad 14a controls one or more groups of illumination devices within the living room, whereas keypad 14b can control one or more groups of illumination devices within the bedroom.

Keypads 14a and 14b in the example shown in FIG. 1 wirelessly communicate over a first communication protocol to their corresponding group or groups of illumination devices via a WPAN RF communication link. However, it is contemplated that a second communication protocol can be used and linked to the first communication protocol via a bridge, gateway, or hub 18 that can be placed in proximity to the structure 10 and can allow the second communication protocol, such as Ethernet, Wi-Fi, etc., to communicate from, for example, a mobile phone proximate to or distal (several hundred miles, or further) from the structure 10 to the various groups of illumination devices 12.

Figure 2:
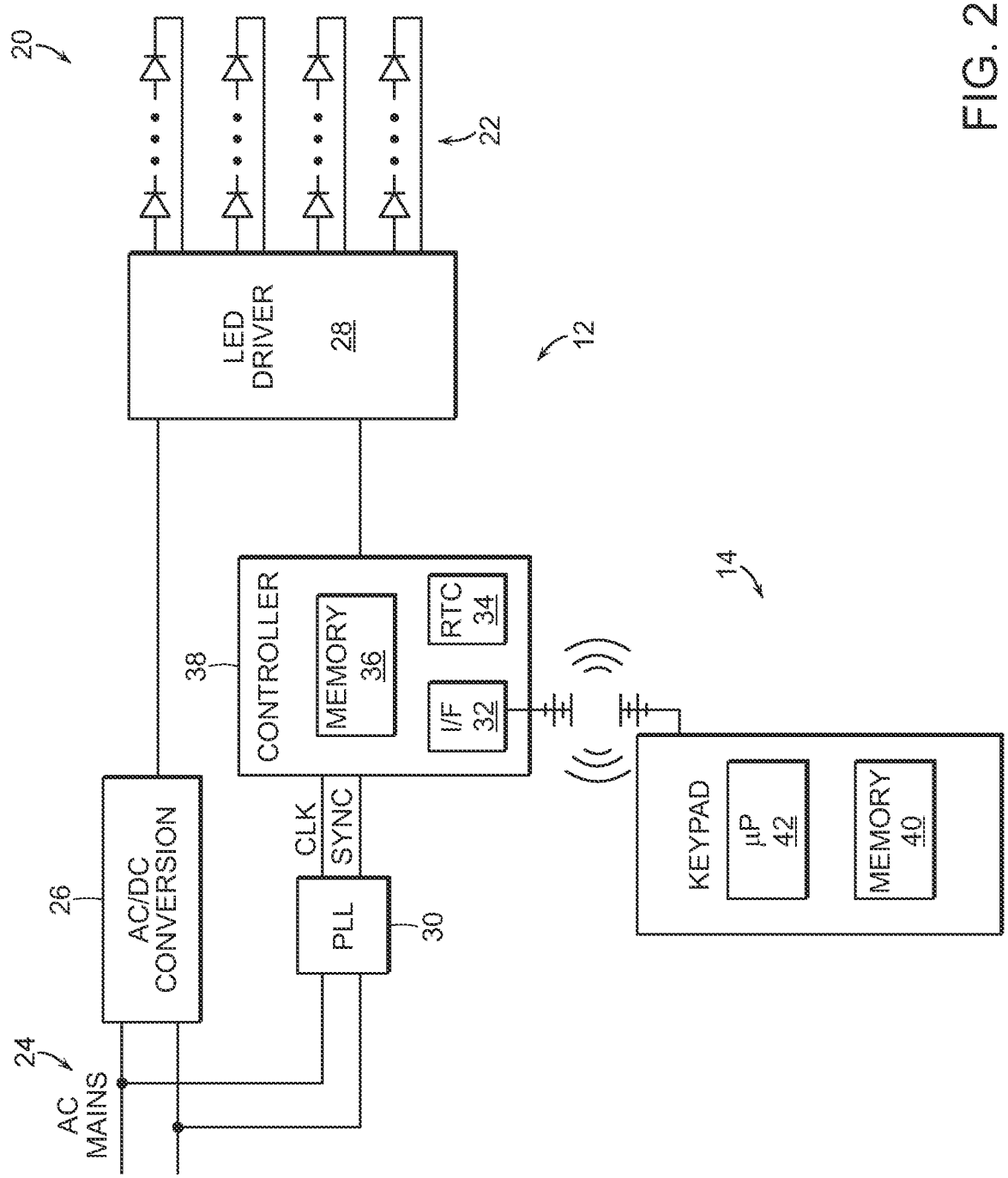
FIG. 2 is a block diagram of an illumination system comprising an illumination device within a group that is controlled by a keypad.

Turning now to FIG. 2, an illumination system 20 is shown according to one example. Illumination system 20 comprises a group of illumination devices controlled by a keypad. For sake of brevity, FIG. 2 illustrates one illumination device 12 possibly within a group of multiple illumination devices controlled by a keypad 14. The illumination device can comprise a plurality of emission LEDs 22 arranged in, for example, four chains of any number of serially-connected LEDs. For example, emission LEDs 22 may include a chain of red LEDs, a chain of green LEDs, a chain of blue LEDs, and a chain of white or yellow LEDs. However, the preferred embodiments are not limited to any particular number of LED chains, any particular number of LEDs within each chain, or any particular color or combination of the LED colors. In some embodiments, the emission LEDs 22 may be mounted on a substrate encapsulated within a primary optic structure of an emitter module, possibly along with one or more photodetectors.

In addition to the emission LEDs 22, illumination device 12 includes various hardware and software components for powering the illumination device 12 and controlling the light output from the one or more emitter modules. In the embodiment shown in FIG. 2, illumination device 12 is connected to AC mains 24, and includes AC/DC conversion 26 for converting the AC mains voltage to a DC voltage. The DC voltage can be supplied directly to a driver circuit, such as an LED driver circuit 28 to produce the drive currents that are then supplied to the emission LEDs 22 for producing illumination. If necessary, another converter, such as a DC/DC converter may be needed to convert the DC voltage to a lower voltage used to power the lower voltage circuit of the illumination device 12, such as phase-locked loop (PLL) 30, interface 32, real-time clock 34, and memory 36 of controller 38. The DC/DC converter may or may not be needed, and additional timing circuitry may be needed to provide timing and synchronization signals to the controlling driver circuits.

In the illustrated embodiment of FIG. 2, PLL 30 is included within illumination device 12 for providing timing and synchronization signals. PLL 30 can lock onto the AC mains frequency and can produce a high-speed clock (CLK) signal and a synchronization signal (SYNC). The CLK signal provides timing for the controller 38 as well as the LED driver circuit 28. The SYNC signal is used by the controller 38 to create the timing signals used to control the LED driver 28. An example of various configurations for illumination device 12 are set forth in U.S. Pat. No. 9,392,663, commonly assigned and herein incorporated by reference.

Interface 32 within illumination device 12 can be used to receive datasets, or content, from an external calibration tool during manufacturing of the device, or during provisioning or commissioning of the illumination device 12, or group of illumination devices. The datasets or content received via interface 32 may be stored in a mapping table within storage medium 36 of controller 38, for example. Examples of data set or content that may be received via interface 32 include, but are not limited to, the luminous flux, brightness, intensity, wavelength, chromaticity, and/or color temperature emitted by the illumination module 22. In addition, an address of each illumination device as well as a common group address for a group of illumination devices that are to have common start and end illumination values controlled by a single groupcast signal can be stored as content within memory 36 during commissioning or provisioning of the various illumination devices 12 within structure 10. The mechanism in which illumination devices are grouped during the commissioning process and as well as addresses and group addresses assigned to each group as well as content stored in the various groups is set forth in U.S. Pat. No. 9,655,215, commonly assigned and herein incorporated by reference.

In addition to receiving datasets or content during provisioning or commissioning of various groups of illumination devices, interface 32 can also be used to receive commands, or signals, from, for example, one or more keypads 14 remote from, yet wirelessly communicating with, one or more groups of illumination devices 12, as shown in FIG. 2. By user actuation on a button or slider of keypad 14, a command to change the illumination value previously stored in an illumination device can be wirelessly transmitted. Like controller 38 of each illumination device 12, keypad 14 contains a memory 40. For reasons that will be described below, memory 40, like memory 36, contains start and end illumination values. The start illumination value within each of the group of illumination devices stored in memory 36 is preferably the same as the start illumination value within memory 40 of keypad 14 that controls that group. Likewise, the end illumination value stored in each of the group of illumination devices within the corresponding memory 36 is the same as the end illumination value stored in memory 40 of keypad 14. Also, preferably, the end illumination value is computed by a processor 42 by fetching the start illumination value within memory 40 and updating that illumination value to an end illumination value as will be described below. The end illumination value is then groupcast as a value within a command to obtain the end illumination value sent to the appropriate group of illumination devices based on the group address stored in memory 36 of each of the illumination devices within that group.

While interface 32 is preferably a wireless interface configured to operate over an RF channel according to, for example, ZigBee, or any other proprietary or standard wireless data communication protocol, interface 32 can also comprise a wired interface to, for example, a wire that couples from keypad 14 to each of the plurality of illumination devices within structure 10. Using the CLK and SYNC signals received from PLL 30, real-time clock (RTC) 34 can receive via interface 32 a periodic set of time-of-day signals from, for example, keypad 14 to periodically change the scene within one or more groups of illumination devices at a time-based interval to create a show. The show can have a change in daylight emulation as a function of time of day as described in U.S. Pat. No. 9,655,215, commonly assigned and herein incorporated by reference.

Figure 3:
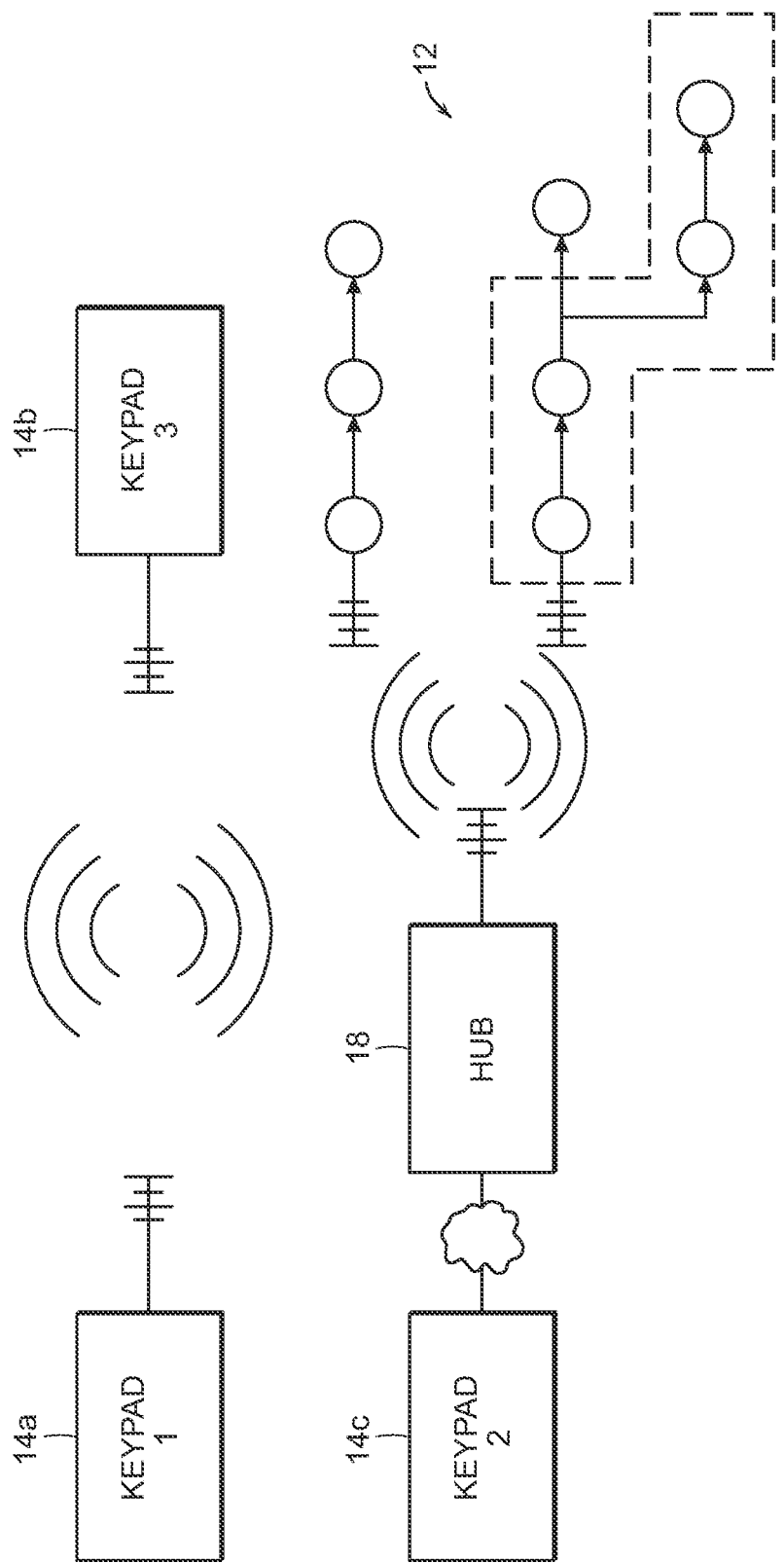
FIG. 3 is a plan diagram of a group of illumination devices within a network wirelessly controlled by one or more keypads for receiving one or more illumination values.

FIG. 3 illustrates the different types of communication protocols, as well as communication between different types of keypads 14 and one or more groups of illumination devices 12. A keypad, such as keypad 14a or 14b, can simply be one or more mobile devices that include a dongle with a USB interface and radio. The dongle can be plugged into the USB port of the mobile device and the combination of both forms keypads 14a or 14b that communicates through that dongle, or built-in interface, to the appropriate interface within each of the illumination devices 12 of a group or groups of illumination devices. Not only does a keypad with external interface or built-in interface communicate with the corresponding interfaces of illumination devices 12 directly via the wireless personal area network (WPAN) but can also correspond with each other so that one keypad can wirelessly communicate with another, as shown. If a keypad, such as a mobile device or smartphone with external or built-in interface 14c is to communicate through a hub, bridge, or gateway 18, then keypad 14c communicates using a different protocol (second protocol) than that of the first protocol at which the various illumination devices 12 communicate with each other as well as keypads 14a and 14b.

Figure 4:
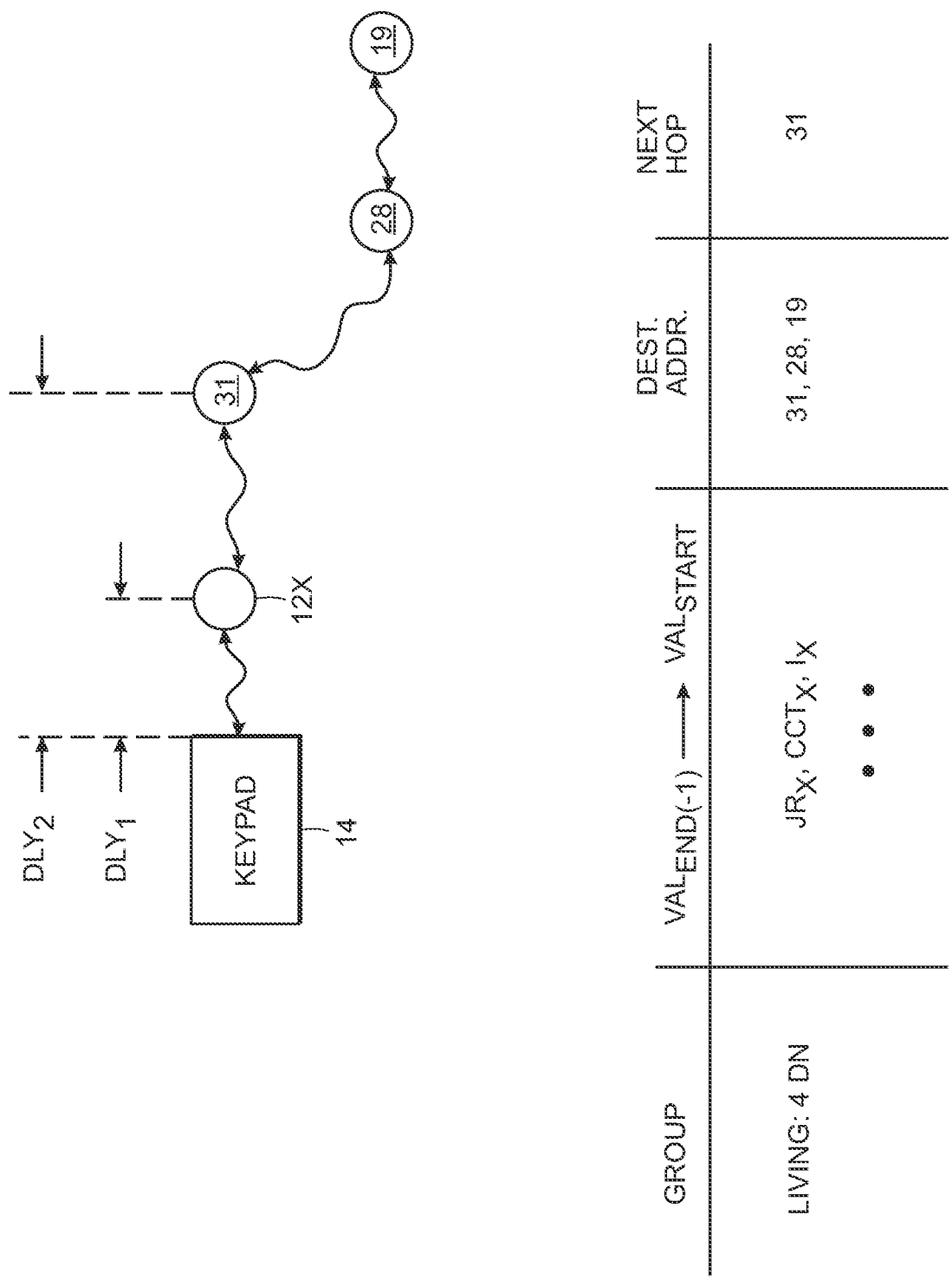
FIG. 4 is an example of a group of illumination devices having a group address as well as scene or show content stored therein, accessible by the keypad to change upon groupcast addressing of an illumination value stored within the group with various delays in the change.

During the discovery, commissioning, or provisioning phase, for example, a broadcast discovery signal is sent from keypad 14 through the WPAN mesh network from hop-to-hop, as shown by FIG. 4. The broadcast discovery signal is acknowledged with an acknowledge signal sent back from, for example, unique addresses 19 to 28 to 31 illustrated, for example, in hexadecimal. The broadcast discovery and acknowledge back forms a routing table with a destination address and next hop address shown in FIG. 4 for a particular illumination device 12X. The routing table is stored in the memory of illumination device 12X, along with what will be described as the group address and the content associated with that group address. The group address and content can have a group address of, for example, the four downlights within the living room of structure 10 shown in FIG. 1 and illustrated in the routing table of FIG. 4 (LIVING: 4 DN) thereby forming the groupcast table. Descriptions of forming the groupcast table as stored in the memory of each illumination device within each group, as well as the content, destination addresses, and the next hop address, are illustrated in U.S. Pat. No. 9,655,215, commonly assigned and herein incorporated by reference.

Of importance, shown in FIG. 4, is that each illumination device within a particular group address, such as the living room four downlight group address, is the same. In particular, the illumination values stored in the memory of each illumination device within a group is the end illumination value that becomes the start illumination value when the keypad button undergoes the next press state. The common end illumination value becomes the subsequent common start illumination value or any values which have an effect on the output of an illumination device, such as brightness, intensity, chromaticity, color temperature, wavelength, flux, etc. Those illumination values can be stored as part of the groupcast table within memory of each illumination device within the group so that when a button is actuated on the keypad, and depending on that button, an end illumination value or a start illumination value is stored.

Importantly, when a press state occurs on a button of a keypad, not only is a groupcast address sent to each illumination device within that group, but also a start-change command is sent to change the illumination value toward an end illumination value computed on release of that button. As shown in FIG. 4, depending on the distance between keypad 14 and each of the illumination devices within a group of illumination devices beginning with illumination device 12X, a different delay occurs before each illumination device receives the start-change command That delay, whether $DLY_1$ or $DLY_2$, depending on the illumination device being affected, causes each illumination device within the group to achieve the end illumination value at different times after the release state occurs.

Figure 5:
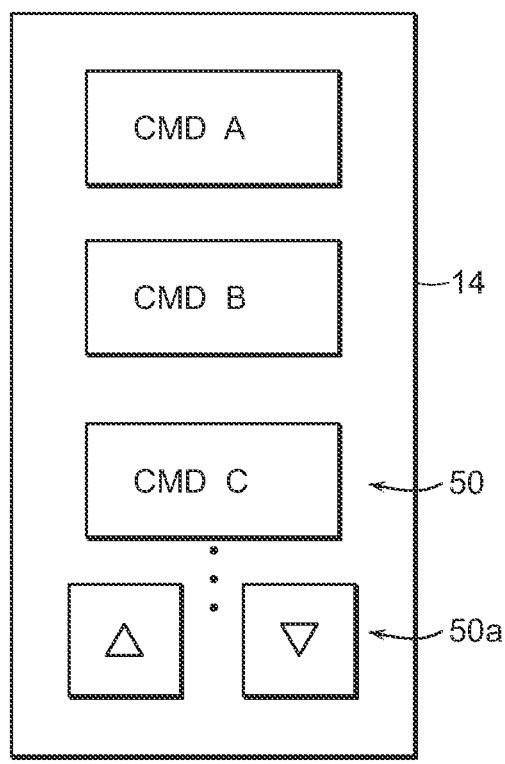
FIG. 5 is an example of buttons on a keypad, according to one embodiment, to change the illumination values of a group of illumination devices wirelessly controlled by the keypad.
Figure 6:
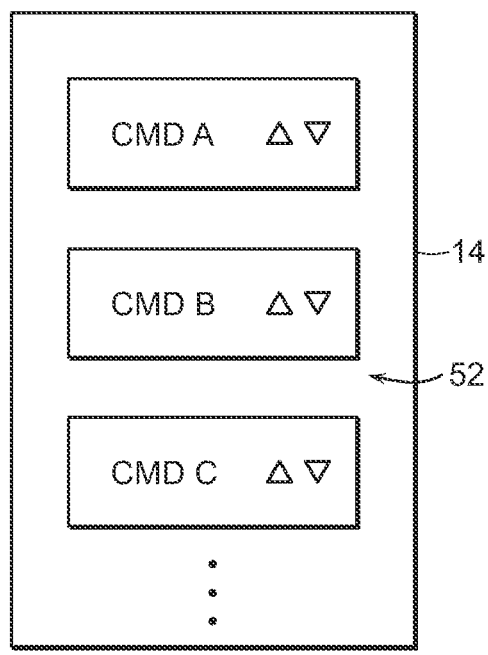
FIG. 6 is an example of buttons on a keypad, according to another embodiment, to change the illumination values of a group of illumination devices wirelessly controlled by the keypad.

Turning now to FIGS. 5 and 6, a keypad 14, whether appearing on a faceplate of a switch coupled to a wall or on a GUI of, for example, a mobile device, can take on different configurations. For example, as shown in FIG. 5, keypad 14 can present or display various buttons or sliders 50 that, when actuated by a user, send various commands or signals from keypad 14 to a group of illumination devices 12. According to the embodiment of FIG. 5, associated with buttons 50 are plus and minus buttons 50a. When a command button 50 is depressed and, at the same time, or shortly thereafter, a plus or minus button 50a is depressed and held, a start-change signal and a change-in-illumination signal or command is sent. Depending on whether the plus button or the minus button is depressed, the command to increase or decrease, respectively, the illumination value in the receiving group of illumination devices is undertaken. For example, if the illumination value is brightness, then the plus or increase button 50a will cause a reverse dimming (increase in brightness) on the recipient illumination devices 12. Conversely, if the negative or decrease button 50a is depressed, a fading of brightness in the receiving illumination devices 12 will be undertaken.

The amount of change in illumination value depends on the amount of time that the increase or decrease button 50a is depressed. Moreover, to distinguish from an inadvertent "tap" by a user and not a purposeful "press," a timer may be necessary. The increase or decrease button must therefore be depressed for a hold time exceeding a predetermined amount of time given the timer readout to distinguish between an actual button press state and an inadvertent tap condition. Thus, a tap on a button, and particular, the inadvertent increase or decrease on tapping buttons 50a, will not register a change in illumination value in the illumination devices unless the tap becomes a press due to the user depressing the button beyond a predetermined hold time.

Instead of having actual increase and decrease buttons 50a as shown in FIG. 5, FIG. 6 illustrates an alternative embodiment where a user need only depress a single button 52 past a certain amount of time to cause the start-change signal and either an increase or a decrease in illumination value upon the illumination devices 12. There may be multiple ways in which to discern if the press-and-hold is to increase or decrease illumination value, where one way may simply be depressing one end or the opposing other end of a corresponding toggle-configured button 52. Another way may be to use a single- or a dual-tap before pressing and holding the corresponding button 52. Of course, there can be numerous other ways to discern an increase or decrease in the illumination value yet use a single button for doing so.

As shown in both embodiments of FIGS. 5 and 6, there can be multiple commands since there are multiple different types of illumination values that can be changed. For example, command A can be dedicated to intensity, whereas command B can be dedicated to brightness, and command C can be dedicated to color temperature, etc. Given the rather large number of various illumination values, the number of command buttons 50 and 52 can be quite large corresponding to each illumination value that can be changed.

Figure 7:
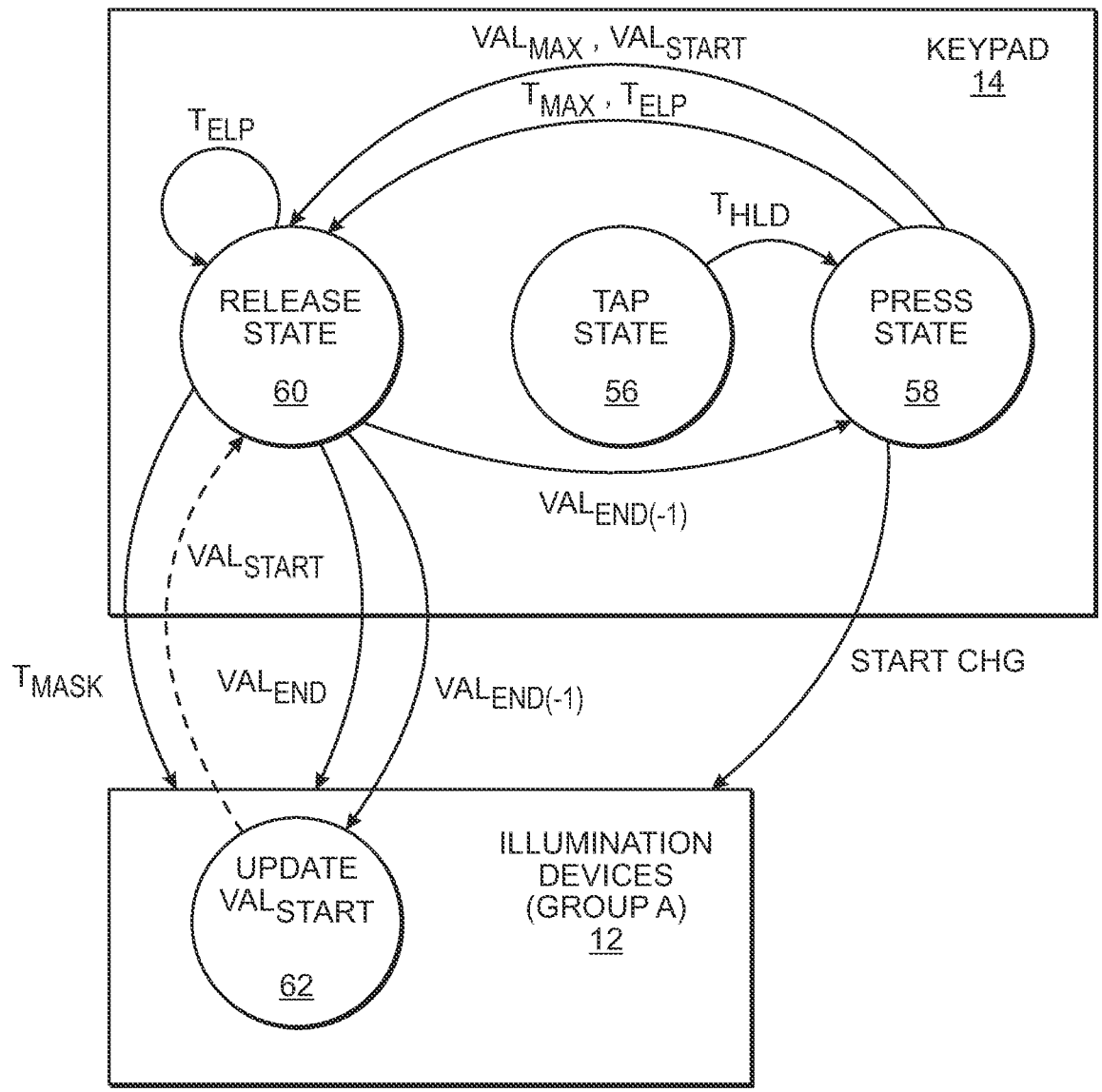
FIG. 7 is a state diagram of the press, hold, and release states and the effect on the start and end illumination values communicated to the group of illumination devices and the keypad.

Turning now to FIG. 7, a state diagram is shown of the various states of an illumination system comprising a keypad 14 and a group of illumination devices 12 affected by operation of that keypad 14. When a user first depresses a button, or actuates a trigger, on keypad 14, a tap state 56 is detected. If that button remains depressed or actuated past a hold time ($T_{HLD}$), a press state 58 is detected. The hold time can be a pre-determined time, such as 300 ms from when a timer is started in the tap state 56. Once in the press state 58, another timer can be set, and the elapsed time ($T_{ELP}$) is computed until such time as the button is released in the release state 60. Meanwhile, while in the press state 58, the elapsed time until the release state is sent along with the start illumination value stored in memory 40 of keypad 14. For example, if the increase button 50a in FIG. 5 is pressed and held, that button will indicate an increase from a start illumination value that pre-existed in memory 40. Also sent to the release state is a maximum illumination value ($VAL_{MAX}$), as well as a maximum time ($T_{MAX}$) needed to achieve that maximum value. The maximum time can be a pre-defined time needed to achieve a smooth transition from a relatively low start illumination value ($VAL_{START}$) to a maximum illumination value ($VAL_{MAX}$). Importantly, the maximum illumination value is either the maximum value if increased or decreased. For example, if brightness is the illumination value, then the maximum illumination value is the maximum reverse fading value or positive fading value.

Having received maximum illumination value, the start illumination value, the maximum time value, and the maximum elapsed value, upon release of the button during release state 60, a computation occurs whereby the end illumination value ($VAL_{END}$) is sent from release state 60 to the group of illumination devices 12. A more detailed explanation of the computation occurring in the release state 60 and an example of different values, including the end illumination value, is set forth in FIG. 8. FIG. 7, however, illustrates the importance of the various states and what occurs in each state, both in the keypad 14 and the group of illumination devices 12. As shown, the start illumination value is taken from the preceding end illumination value ($VAL_{END(-1)}$) within keypad 14. If, for some reason, keypad 14 loses power and thus the start illumination value is lost, keypad 14 can draw the start illumination value ($VAL_{START}$), shown in dash line, from the update $VAL_{START}$ state 62 in illumination devices 12. The update $VAL_{START}$ state generates the start illumination value shown in dash line from the preceding end illumination state stored in memory 40 of the illumination devices 12 so that both the keypad and its corresponding group of illumination devices 12 have a common start illumination value as well as a common end illumination value. In addition, FIG. 7 illustrates a masking time ($T_{MASK}$) sent from release state 60 to each of the group of illumination devices 12 to give those devices enough time to complete their change in illumination values needed to achieve a common end illumination value, as will be described in more detail in FIG. 9.

Figure 8:
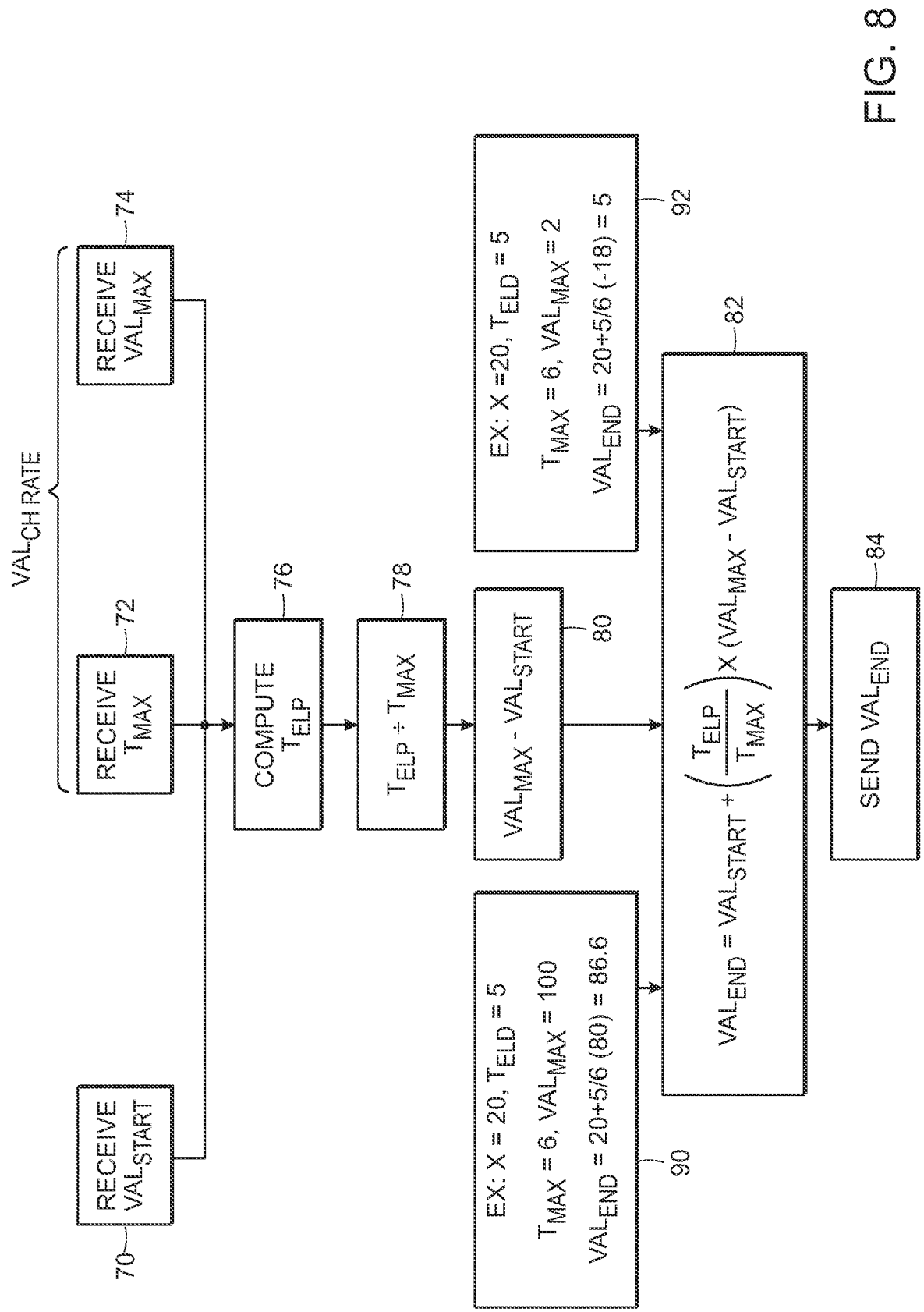
FIG. 8 is a flow diagram illustrating the computation of an end illumination value and sending of same from the keypad to the group of illumination devices.

Turning to FIG. 8, the computation of the end illumination value within keypad 14 is shown. The computation begins by receiving the start illumination value, the maximum time needed to achieve a maximum illumination value 72, and the maximum illumination value 74. Once the button is released after being held past the hold time, the keypad enters the release state 60 and the timer times out to an elapsed time that is computed at block 76. The amount of elapsed time the button to increase/decrease an illumination value is held past the hold time then released, or $T_{ELP}$, is then divided by the maximum time needed to achieve a maximum (or minimum) illumination value at block 78. The start illumination value is then subtracted from the maximum illumination value 80, and all the various values, and particularly the start illumination value plus the elapsed time divided by the maximum time multiplied by the maximum value minus the start illumination value, are computed at block 82 to achieve the end illumination value ($VAL_{END}$). The end illumination value is then sent at block 84 from the keypad 14 to the group of illumination devices 12 it controls in a groupcast signal addressed to that group. The group of illumination devices 12 will continue their rate of change in illumination value set out in block 82, such that the group of illumination devices 12 will eventually achieve the end illumination value at a gradual and consistent rate defined as $(T_{ELP}/T_{MAX})$ *$(VAL_{MAX}-VAL_{START})$. Therefore, instead of increasing or decreasing more rapidly than the rate of previous change (i.e., popping) to the end illumination value once received, the masking time allows the gradual rate of previous change to continue smoothly over, for example, one second masking time until the end illumination value is eventually obtained. Continuing the gradual previous rate of change and having a pre-defined masking time that ensures all changes can be completed within that time, any error between the illumination values within each illumination device within the group is essentially hidden, or masked, from visual detection as they would gradually change at the previous rate, without visually "popping", to the common end illumination value. The keypad 14 will maintain its end illumination value common to the sent and stored end illumination value in each of the group of illumination devices. Moreover, the common end illumination value becomes the common start illumination value when the button is subsequently pressed in a press state and thereafter released in a release state. In this fashion, the end illumination value always remains the same within the keypad and the group of illumination devices it controls, as does the start illumination value.

An example of the various values to help explain the computation is an increasing change in illumination value, shown in block 90, and a decreasing change in illumination value, shown in block 92. Beginning with block 90, the start illumination value can be 20, either in absolute or relative (e.g., percentage) value. The start illumination value is symbolized with an "X". The elapsed time can be 5 seconds, and the maximum time to achieve a maximum increase to a maximum value can be 6 seconds. If the maximum illumination value is 100, then the end illumination value (VAL END) is equal to 20+5/6 (100−20), or 88.6 in the example shown in block 90. Conversely, if a decrease in illumination value is undertaken, then block 92 illustrates a start illumination value, X equal to 20, and elapsed time of 5 seconds, a maximum time of 6 seconds, and a maximum illumination value now being only 2, since a decrease is undertaken from 20 down to 2. Thus, a maximum illumination value can be thought of as a maximum lower value upon decrease. Since the elapsed time does not equal the maximum time, the end illumination value (VAL END) equals 20+5/6 (2−20), or 5, rather than 2.

Figure 9:
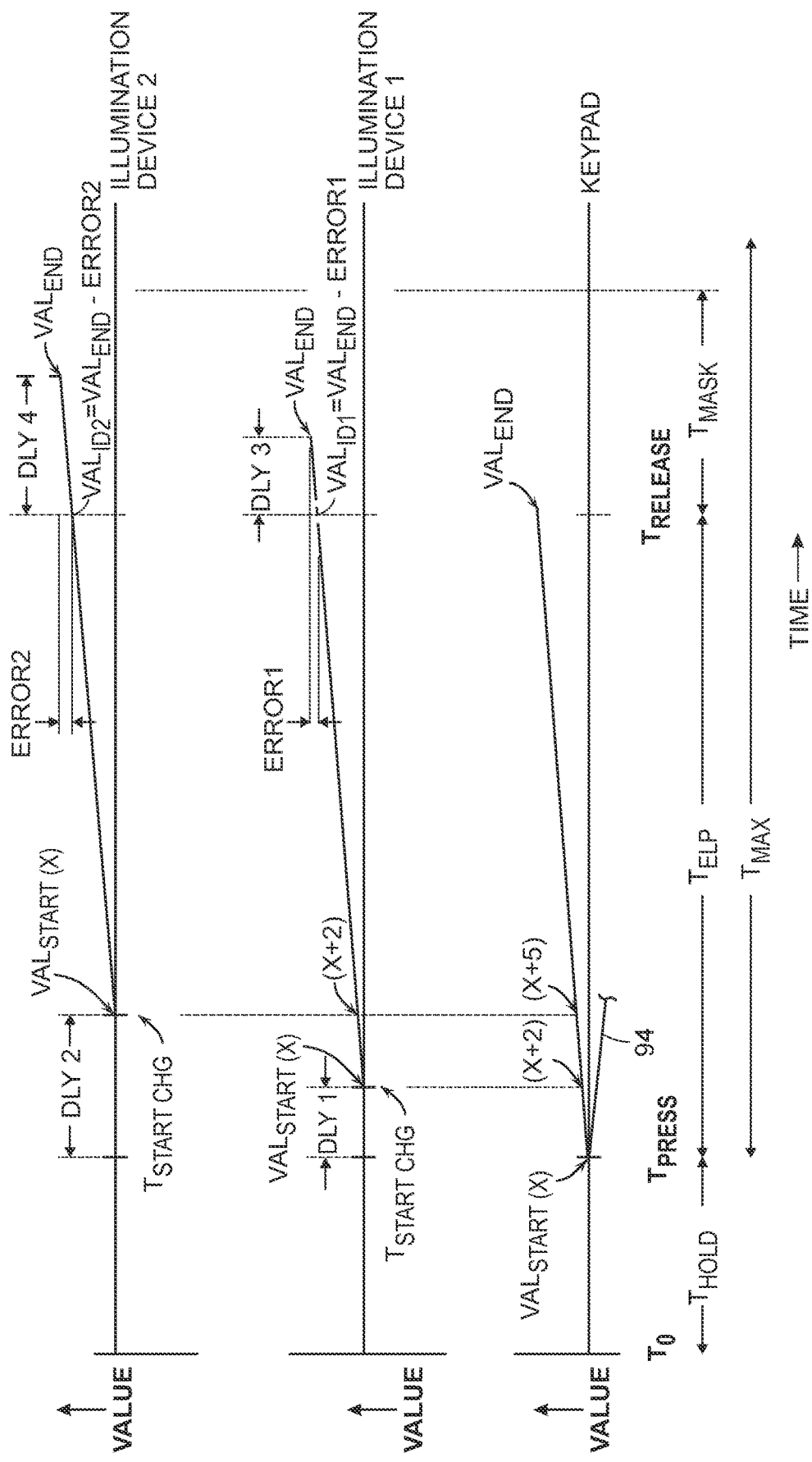
FIG. 9 is a timing diagram of the delay from a press state on the keypad to when a change in illumination value begins on various illumination devices within the group, and the corresponding masking time needed to make the end illumination value common among the illumination devices.

The example illustrated in FIG. 8 can be applied to the timing diagram of FIG. 9. FIG. 9 illustrates the hold time (Thom) after a tap occurs to when a press occurs at $T_{PRESS}$. The press state at time $T_{PRESS}$ causes the keypad to send a start illumination value of magnitude X at time $T_{PRESS}$. It is not until a release state at time $T_{RELEASE}$ is an elapsed time TEED calculated, as well as the end illumination value. As illustrated in FIG. 8, the end illumination value is sent from the keypad 14 to each of the illumination devices 12 within the group.

However, to achieve the end illumination value on each of the disparately-located illumination devices, a masking time, $T_{MASK}$, is needed. That disparity in time is due to the different locations between the keypad and each of the group of illumination devices. For example, the first illumination device (illumination device 1) may not receive the start-change signal until time ($T_{START\ CHG}$) when $DLY_1$ has occurred. Thus, even though the start-change signal is sent from the keypad at time $T_{PRESS}$, it does not arrive at the first illumination device until $DLY_1$ has expired, or at time $T_{START\ CHG}$. At the time in which the start-change signal is received on the first illumination device, the magnitude of the start illumination value is at X, even though the keypad illumination value is at X+2, as shown. Meanwhile, an illumination value X+5 on the keypad registers only as an illumination value of X+2 on the first illumination device. Meanwhile, due to $DLY_2$ being greater than $DLY_1$, the illumination value in the keypad is at X+5, the first illumination device is at X+2, and the illumination device 2 is only at the start illumination value, or X. The numbers shown above in the example are arbitrarily chosen only to show relative differences in start illumination values between the keypad 14 and illumination devices 12 within a group.

The differing times at which the start illumination value occurs on each illumination device, and therefore the differing times at which the start-change signals received on each of the different illumination devices, causes differing errors in illumination value on the illumination devices compared to the end illumination value when the button is released on the keypad at $T_{RELEASE}$. The error on the first illumination device causes the illumination value ($VAL_{ID1}$) to be less than the end illumination value sent by the keypad when the button is released at $T_{RELEASE}$. Accordingly, $VAL_{ID1}$ is equal to end illumination value minus an error. The error increases from error 1 to error 2 from illumination device 1 to illumination device 2, causing an increased error, and therefore a lessened illumination value ($VAL_{ID2}$) at $T_{RELEASE}$ upon $VAL_{ID2}$ relative to $VAL_{ID1}$.

The example in FIG. 9 illustrates an increasing change in the illumination value. However, it is understood that a decreasing change in illumination value can alternatively occur, as shown by line 94. However, for sake of brevity in the drawing, both increasing and decreasing illumination values are not shown in favor of showing only one with the understanding that a change in illumination value applies to either an increase or a decrease.

For the group of illumination devices being controlled by a keypad to achieve the end illumination value sent from the keypad to that group, a masking time ($T_{MASK}$) is needed that would exceed the last illumination device that arrives at the end illumination value. The masking time can be preset, with the knowledge that whatever that preset time is, there would be sufficient time allocated for the last illumination device to achieve its end illumination value. For example, the preset time can be set at, for example, one second. Having sufficient masking time ensures that all the illumination devices within the group do not end up in an unknown illumination value state at the end of one second but, instead, all end up in the end illumination value within one second. Thereafter, when the next press-and-hold occurs, the previous end illumination value is used for the start illumination value, and the start illumination value is consistent among all the illumination devices within the group as well as the keypad that controls the group. Synchronizing the start illumination value and the end illumination value, whatever those values, in the illumination devices as well as the controlling keypad, ensures all the illumination devices change their illumination values in parallel with the keypad and that the change begins on a common value and ends on a common value.

It will be appreciated by those skilled in the art having the benefit of this disclosure that this invention is believed to provide synchronized start and end illumination values among a keypad in a group of illumination devices being controlled by that keypad. It is also appreciated that this mechanism and method for synchronizing a keypad stored value to illumination devices stored value can extend to any value, at the beginning and end of change, to any group of devices being controlled and a controlling device. Examples of such devices can extend beyond simply illumination, but to, e.g., a joystick controlling a group of robot positions, etc. Any system that proves beneficial to maintain a common start and end value among the controlling and controlled devices is hereby encompassed by the inventive aspects described herein. Further modifications and alternative embodiments of various aspects of the invention will be apparent to those skilled in the art in view of this description. It is intended that the following claims will be interpreted to embrace all such modifications and changes. Accordingly, the specification and drawings are to be regarded in an illustrative rather than a restrictive sense.

The invention claimed is:

1. An electric load control device to control an output parameter of each of a plurality of illumination devices, the electric load control device comprising:
   memory circuitry;
   electric load control circuitry coupled to the memory circuitry, the electric load control circuitry to:
   receive an input that includes:
      an actuation start;
      an actuation end; and
      an actuation duration between the actuation start and the actuation end;
   responsive to receipt of the actuation start:
      cause a communication, to the plurality of illumination devices, of a first signal that includes an instruction to begin to change an output parameter of the illumination device from a current output parameter value; and
      retrieve, from memory circuitry, data representative of the current output parameter value of each of the plurality of illumination devices; and
   responsive to receipt of the actuation end:
      determine a target output parameter value of each of the plurality of illumination devices based on the current output parameter value and the actuation duration;
      cause a storage in memory circuitry of the determined target output parameter value as the current output parameter value; and
      cause a communication to the plurality of illumination devices of a second signal that includes data indicative of the determined target output parameter value, such that the plurality of illumination devices reach the target output parameter value no later than a masking interval after the receipt of the actuation end.

2. The electric load control device of claim 1 wherein to cause the communication of the first signal to the plurality of illumination devices, further comprises:
cause a wireless communication to the plurality of illumination devices of the first signal, wherein the first signal includes the instruction to begin to change the output parameter of the illumination device from the current output parameter.

3. The electric load control device of claim 1 wherein to cause the communication of the second signal to the plurality of illumination devices, further comprises:
cause a wireless communication to the plurality of illumination devices of the second signal that includes data indicative of the determined target output parameter value.

4. The electric load control device of claim 1 wherein to communicate, to the plurality of illumination devices, the first signal that includes the instruction to begin to change the output parameter of the illumination device from the current output parameter further comprises:
communicate, to the plurality of illumination devices, the first signal that includes the instruction to begin to change an output illumination intensity of the illumination device from a current output illumination intensity.

5. The electric load control device of claim 1 wherein to communicate the second signal that includes data indicative of the determined target output parameter value to the plurality of illumination devices further comprises:
communicate, to the plurality of illumination devices, the second signal that includes data indicative of the determined target output parameter value, such that the plurality of illumination devices reach the target output parameter value no later than a masking interval having a duration greater than or equal to a temporal duration of a greatest communication latency between the plurality of illumination devices.

6. A method to control an output parameter of each of a plurality of illumination devices comprising:
receiving, by electric load control circuitry, an input that includes:
an actuation start;
an actuation end; and
an actuation duration between the actuation start and the actuation end;
responsive to receipt of the actuation start:
causing, by the electric load control circuitry, a communication of a first signal to the plurality of illumination devices, wherein the first signal includes an instruction to begin to change an output parameter of the illumination device from a current output parameter; and
retrieving, by the electric load control circuitry from memory circuitry, data representative of the current output parameter value of each of the plurality of illumination devices; and
responsive to receipt of the actuation end:
determining, by the electric load control circuitry, a target output parameter value of each of the plurality of illumination devices based on the current output parameter value and the actuation duration;
causing, by the electric load control circuitry, a storage of the determined target output parameter value as the current output parameter value in the memory circuitry; and
causing, by the electric load control circuitry, communication of a second signal to the plurality of illumination devices, wherein the second signal includes data indicative of the determined target output parameter value to the plurality of illumination devices, such that the plurality of illumination devices reach the target output parameter value no later than a masking interval after the receipt of the actuation end.

7. The method of claim 6 wherein causing the communication of the first signal to the plurality of illumination devices, further comprises:
causing, by the electric load control circuitry, a wireless communication of the first signal to the plurality of illumination devices, wherein the first signal includes the instruction to begin to change the output parameter of the illumination device from the current output parameter.

8. The method of claim 7 wherein causing the communication of the second signal to the plurality of illumination devices, further comprises:
causing, by the electric load control circuitry, a wireless communication of the second signal to the plurality of illumination devices, wherein the second signal includes the data indicative of the determined target output parameter value to the plurality of illumination devices.

9. The method of claim 6 wherein causing the communication of the first signal to the plurality of illumination devices further comprises:
causing, by the electric load control circuitry a communication of the first signal to the plurality of illumination devices, wherein the first signal that includes an instruction to begin to change an output illumination intensity of the illumination device from a current output illumination intensity value.

10. The method of claim 6 wherein causing the communication of the second signal to the plurality of illumination devices, further comprises:
causing, by the electric load control circuitry a communication of the second signal to the plurality of illumination devices, wherein the second signal includes data indicative of the determined target output parameter value, such that the plurality of illumination devices reach the target output parameter value no later than a masking interval having a duration greater than or equal to a temporal duration of a greatest communication latency between the plurality of illumination devices.

11. A non-transitory, machine-readable, storage device that includes instructions that, when executed by electric load control circuitry to control an output parameter of each of a plurality of illumination devices, cause the electric load control circuitry to:
receive an input that includes:
an actuation start;
an actuation end; and
an actuation duration between the actuation start and the actuation end;
responsive to receipt of the actuation start:
cause a communication of a first signal to the plurality of illumination devices, wherein the first signal includes an instruction to begin to change an output parameter of the illumination device from a current output parameter; and retrieve, from memory circuitry, data representative of the current output parameter value of each of the plurality of illumination devices; and responsive to receipt of the actuation end:

determine a target output parameter value of each of the plurality of illumination devices based on the current output parameter value and the actuation duration;

cause a storage of the determined target output parameter value as the current output parameter value in the memory circuitry; and cause communication of a second signal to the plurality of illumination devices, wherein the second signal includes data indicative of the determined target output parameter value to the plurality of illumination devices, such that the plurality of illumination devices reach the target output parameter value no later than a masking interval after the receipt of the actuation end.

12. The non-transitory, machine-readable, storage device of claim 11 wherein the instructions that cause the electric load control circuitry to cause the communication of the first signal to the plurality of illumination devices, further cause the electric load control circuitry to:

cause a wireless communication of the first signal to the plurality of illumination devices, wherein the first signal includes the instruction to begin to change the output parameter of the illumination device from the current output parameter.

13. The non-transitory, machine-readable, storage device of claim 12 wherein the instructions that cause the electric load control circuitry to cause the communication of the second signal to the plurality of illumination devices, further cause the electric load control circuitry to:

cause a wireless communication of the second signal to the plurality of illumination devices, wherein the second signal includes the data indicative of the determined target output parameter value to the plurality of illumination devices.

14. The non-transitory, machine-readable, storage device of claim 11 wherein the instructions that cause the electric load control circuitry to cause the communication of the first signal to the plurality of illumination devices further cause the electric load control circuitry to:

cause a communication of the first signal to the plurality of illumination devices, wherein the first signal that includes an instruction to begin to change an output illumination intensity of the illumination device from a current output illumination intensity value.

15. The non-transitory, machine-readable, storage device of claim 11 wherein the instructions that cause the electric load control circuitry to cause the communication of the second signal to the plurality of illumination devices, further comprises:

cause a communication of the second signal to the plurality of illumination devices, wherein the second signal includes data indicative of the determined target output parameter value, such that the plurality of illumination devices reach the target output parameter value no later than a masking interval having a duration greater than or equal to a temporal duration of a greatest communication latency between the plurality of illumination devices.

* * * * *